United States Patent
Herzinger

[11] Patent Number: 6,137,618
[45] Date of Patent: Oct. 24, 2000

[54] COMPACT, HIGH EXTINCTION COEFFICIENT COMBINATION BREWSTER ANGLE AND OTHER THAN BREWSTER ANGLE POLARIZING SYSTEM, AND METHOD OF USE

[75] Inventor: Craig M. Herzinger, Lincoln, Nebr.

[73] Assignee: J. A. Woollam Co. Inc., Lincoln, Nebr.

[21] Appl. No.: 09/246,872

[22] Filed: Feb. 8, 1999

[51] Int. Cl.$^7$ ............................................. G02F 1/03
[52] U.S. Cl. ...................... 359/245; 359/246; 359/240; 359/483; 359/487
[58] Field of Search ..................... 359/245, 246, 359/240, 487, 485, 483

[56] References Cited

U.S. PATENT DOCUMENTS

| | | | |
|---|---|---|---|
| 2,815,452 | 12/1957 | Mertz | 250/338.1 |
| 3,428,388 | 2/1969 | Kuebler et al. | 359/352 |
| 3,439,968 | 4/1969 | Hansen et al. | 359/352 |
| 4,221,464 | 9/1980 | Pedinoff et al. | 350/152 |
| 4,389,617 | 6/1983 | Kurnit | 330/4.3 |
| 4,394,623 | 7/1983 | Kurnit | 330/4.3 |
| 4,664,484 | 5/1987 | Hines | 350/394 |
| 4,733,926 | 3/1988 | Title | 350/1.1 |
| 4,734,911 | 3/1988 | Bruesselbach | 372/21 |
| 4,882,235 | 11/1989 | Resler | 428/642 |
| 4,961,634 | 10/1990 | Chipman et al. | 350/403 |
| 5,177,635 | 1/1993 | Keilmann | 359/352 |
| 5,187,611 | 2/1993 | White et al. | 359/599 |
| 5,402,260 | 3/1995 | Tsuneda et al. | 359/282 |
| 5,475,525 | 12/1995 | Tournois et al. | 359/245 |
| 5,548,427 | 8/1996 | May | 359/73 |

*Primary Examiner*—Georgia Epps
*Assistant Examiner*—Tim Thompson
*Attorney, Agent, or Firm*—James D. Welch

[57] ABSTRACT

Disclosed is an electromagnetic beam polarizer system which provides a sequential combination of a Brewster Angle and other than Brewster Angle polarizer system in combination with reflective mirrors, which elements are arranged in any functional order. The electromagnetic beam polarizer system is more compact than multiple Brewster angle polarizer systems, and demonstrates a high extinction coefficient between electromagnetic radiation beam orthogonal components in use.

8 Claims, 3 Drawing Sheets

COMPACT, HIGH EXTINCTION COEFFICIENT COMBINATION BREWSTER ANGLE AND OTHER THAN BREWSTER ANGLE POLARIZING SYSTEM, AND METHOD OF USE

TECHNICAL FIELD

The present invention relates to electromagnetic beam polarizer systems, and more particularly to a compact, high extinction coefficient sequential polarizer system comprising Brewster Angle and non-Brewster Angle polarizer systems and at least two reflecting means, said elements being in any functional order, and method of use.

BACKGROUND

It is well known that ellipsometer and polarimeter systems allow determination of sample system physical and optical properties, (such as thickness, refractive index and extinction coefficient of surface films thereon), by detecting change in "Polarization State" and/or Intensity of a beam of polarized light which is caused to interact with said sample system, where Polarization State here refers to a set of values for Polarized Light Beam Orthogonal Components, (such as "S" and "P"), Magnitude Ratio, and a Phase Angle therebetween. (It is noted that "P" refers to that component which is in a plane containing the normal to a sample system and incident and/or transmitted beam(s) of polarized light, and "S" refers to that component perpendicular thereto and parallel to the surface of said sample system. It is also noted that a "full" polarization state also requires designation of an absolute value to which a magnitude ratio is referenced, and the direction of rotation of a polarized beam of light).

As a general comment it is noted that polarimetry is focused on determining full polarization states of electromagnetic radiation beams, whereas ellipsometry is focused on determining a change in a state of polarization of a beam of electromagnetic radiation because of interaction with a sample system, but both systems have as a common requirement the need for a means to polarize beams of electromagnetic radiation.

Continuing, a polarizer system for polarizing a beam of electromagnetic radiation can be as simple as a physical slit in an opaque material, or can comprise a Wire Grid, or can be a system which operates on the basis of causing unequal effects on orthogonal components of a beam of electromagnetic radiation caused to interact therewith, (ie. a Brewster Angle Polarizer System). It is well known that orthogonal components of a polarized beam of electromagnetic radiation which is caused to interact with a semiconductor substrate for instance, wherein the beam of polarized beam of electromagnetic radiation is caused to approach the semiconductor substrate at an angle of incidence of near seventy-five (75) degrees, are affected differently. The component perpendicular to the semiconductor substrate surface is reflected, while the component parallel to the semiconductor surface is mostly passed therethrough. By subjecting such a beam of electromagnetic radiation to a sequence of such interactions it is possible to produce a linearly polarized beam. Such a configuration, however, requires that a sufficiently large laterally dimensioned space be available to allow for the necessary number of stages required to sufficiently polarize a beam of electromagnetic radiation. It is also noted that polarizer systems should provide a beam of electromagnetic radiation which exits therefrom along a locus which is undeviated and undisplaced from an incident beam of electromagnetic radiation, as in use, said polarizer system is often rotated to provide various planes of polarization to a sample, system, while data is obtained.

A search of Patents provided nothing obviating of the present invention, but did turn-up some references of interest.

For instance, U.S. Pat. No. 4,221,464 to Pedinoff et al. shows a Double Plate Brewster Angle Polarizer (10) (12) which serves to avoid back reflections, which is combined with a Wire Grid Polarizer (28) present on Plate (14). A purpose of the invention is to increase the extinction coefficient of the Wire Grid Polarizer, by combining it with the Double Plate Brewster Angle Polarizer (10) (12).

A U.S. Pat. No. 5,177,635 to Keilmann, shows an Infrared Polarizer Structure of patterned metal strips on a transparent material, but does not suggest a dual polarizer arrangement.

A U.S. Pat. No. 4,961,634 to Chipman et al., shows two polarizers made of CdS and CdSe respectively, in series.

A U.S. Pat. No. 2,815,452 to Mertz, shows multiple Wire Grids oriented at angles with respect to one another. The system is an Interferometer in which said one said Wire Grid is rotated with respect to another.

A U.S. Pat. No. 3,439,968 to Hanson, shows an Infrared Brewster Angle Polarizer.

A U.S. Pat. No. 3,428,388 to Kuebler et al., shows a UV "Biotite" based Brewster Angle Polarizer.

A U.S. Pat. No. 5,187,611 to White eta l., shows a system which illuminates an object while avoiding reflection and glare.

U.S. Pat. Nos. 4,733,926 to Title; 5,548,427 to May and 5,402,260 to Tsuneda et al. were also identified.

Also, a reference titled "ELLIPSOMETRY AND POLARIZED LIGHT", by Azzam and Bashara, North-Holand, 1977, is incorporated by reference into this Disclosure for the purpose of providing general information regarding sample analysis systems utilizing electromagnetic beams, ellipsometry, polarimetry and fundamentals of electromagnetic beams.

A laterally compact polarizer system which would provide a high extinction ration, (ie. a large difference in the magnitude between orthogonal components in a beam of electromagnetic radiation exiting therefrom), and provide a beam of electromagnetic radiation which exits therefrom along a locus which is undeviated and undisplaced from an incident beam of electromagnetic radiation, would provide utility in many applications. The present invention provides such a system, and method of its use.

DISCLOSURE OF THE INVENTION

The present invention is a system for linearly polarizing a beam of electromagnetic radiation comprising, in a functional sequence, a Brewster angle polarizer and a non-Brewster angle polarizer. In one embodiment, between said Brewster and non-Brewster angle polarizer systems, (where "between" is defined by a pathway followed by an electromagnetic beam caused to pass through said non-Brewster angle polarizer and interact with said Brewster angle polarizer), are present at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer; and a beam of electromagnetic radiation is caused to interact with said Brewster angle polarizer, reflect from a first reflective means, reflect from a second reflective means and then pass through said non-Brewster angle polarizer.

In either case an exiting beam of electromagnetic radiation demonstrates a high degree of polarization.

The present invention system for linearly polarizing a beam of electromagnetic radiation also provides that the orientation of at least one of said at least first and second reflective means and said Brewster angle polarizer can be adjusted by at least one motion selected from the group consisting of: (rotational and translational), in at least one dimension, so that a beam of electromagnetic radiation exiting therefrom, can be caused to be undeviated and undisplaced from a beam of electromagnetic radiation caused to enter thereinto said system for linearly polarizing a beam of electromagnetic radiation.

An alternative embodiment of a present invention system for linearly polarizing a beam of electromagnetic radiation comprising, provides, in any functional sequence, a Brewster angle polarizer and a non-Brewster angle polarizer and at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer;

a beam of electromagnetic radiation is caused to interact with said Brewster angle polarizer, reflect from a first reflective means, reflect from a second reflective means and then pass through said non-Brewster angle polarizer;

a beam of electromagnetic radiation is caused to reflect from a first reflective means, pass through said non-Brewster angle polarizer, reflect from a second reflective means and then interact with said Brewster angle polarizer;

a beam of electromagnetic radiation is caused to interact with said Brewster angle polarizer, reflect from a first reflective means, pass through said non-Brewster angle polarizer, and then reflect from a second reflective means;

a beam of electromagnetic radiation is caused to reflect from a first reflective means, reflect from a second reflective means, pass through said non-Brewster angle polarizer, and then interact with said Brewster angle polarizer;

a beam of electromagnetic radiation is caused to interact with said Brewster angle polarizer, pass through said non-Brewster angle polarizer, reflect from a first reflective means, and then reflect from a second reflective means.

That is, said alternative embodiment does not require that two the reflective means be positioned between said Brewster angle and said non-Brewster angle polarizers.

As in the preferred embodiment, the orientation of at least one of said at least first and second reflective means and said Brewster angle polarizer can be adjusted by at least one motion selected from the group consisting of: (rotational and translational), in at least one dimension, so that a beam of electromagnetic radiation exiting, can be caused to be undeviated and undisplaced from a beam of electromagnetic radiation caused to enter, said system for linearly polarizing a beam of electromagnetic radiation.

In any embodiment of a present invention system for linearly polarizing a beam of electromagnetic radiation, the orientation of at least one of said at least first and second reflective means and said Brewster angle polarizer can be adjustable via a rotation about a pivot mounting.

A method of linearly polarizing a beam of electromagnetic radiation comprising the steps of:

a. providing a system for linearly polarizing a beam of electromagnetic radiation comprising, in any functional sequence, a Brewster angle polarizer and a non-Brewster angle polarizer and at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer;

a beam of electromagnetic radiation is caused to interact with said Brewster angle polarizer, reflect from a first reflective means, reflect from a second reflective means and then pass through said non-Brewster angle polarizer;

a beam of electromagnetic radiation is caused to reflect from a first reflective means, pass through said non-Brewster angle polarizer, reflect from a second reflective means and then interact with said Brewster angle polarizer;

a beam of electromagnetic radiation is caused to interact with said Brewster angle polarizer, reflect from a first reflective means, pass through said non-Brewster angle polarizer, and then reflect from a second reflective means;

a beam of electromagnetic radiation is caused to reflect from a first reflective means, reflect from a second reflective means, pass through said non-Brewster angle polarizer, and then interact with said Brewster angle polarizer;

a beam of electromagnetic radiation is caused to interact with said Brewster angle polarizer, pass through said non-Brewster angle polarizer, reflect from a first reflective means, and then reflect from a second reflective means;

said system for linearly polarizing a beam of electromagnetic radiation comprising means for adjusting the orientation of at least one of said at least first and second reflective means and said Brewster angle polarizer, by at least one motion selected from the group consisting of: )rotational and translational), in at least one dimension, so that a beam of electromagnetic radiation exiting, can be caused to be undeviated and undisplaced from a beam of electromagnetic radiation caused to enter, said system for linearly polarizing a beam of electromagnetic radiation;

b. causing an input beam of unpolarized electromagnetic radiation to enter said system for linearly polarizing a beam of electromagnetic radiation, and in a functional order selected from the group consisting of:

first the non-Brewster angle polarizer and second the Brewster angle polarizer; and first the Brewster angle polarizer and second the non-Brewster angle polarizer;

pass through said non-Brewster polarizer and interact with said Brewster angle polarizer and exit as an essentially linearly polarized state exit beam of electromagnetic radiation; and c. as required, adjusting the orientation of at least one of said at least first and second reflective means and said Brewster angle polarizer so that the exit beam of electromagnetic radiation is undeviated and undisplaced from said input beam of unpolarized electromagnetic radiation.

The present invention will be better understood by reference to the Detailed Description Section of the Disclosure with reference to the accompanying Drawings.

SUMMARY OF THE INVENTION

It is therefore a primary purpose of the present invention to teach a polarizer system for polarizing electromagnetic beams of radiation which comprises a Brewster angle and a non-Brewster angle polarizer system in combination with at least two reflective means, in any functional order.

It is another purpose of the present invention to teach a polarizer system for polarizing electromagnetic beams of radiation which is more laterally compact than is a double Brewster angle polarizer system.

It is yet another purpose of the present invention to teach a polarizer system for polarizing electromagnetic beams of radiation which provides sufficient degrees of adjustment freedom to allow a beam of electromagnetic radiation which passes therethrough to do so without experiencing significant displacement or deviation.

DETAILED DESCRIPTION

Figure 1:
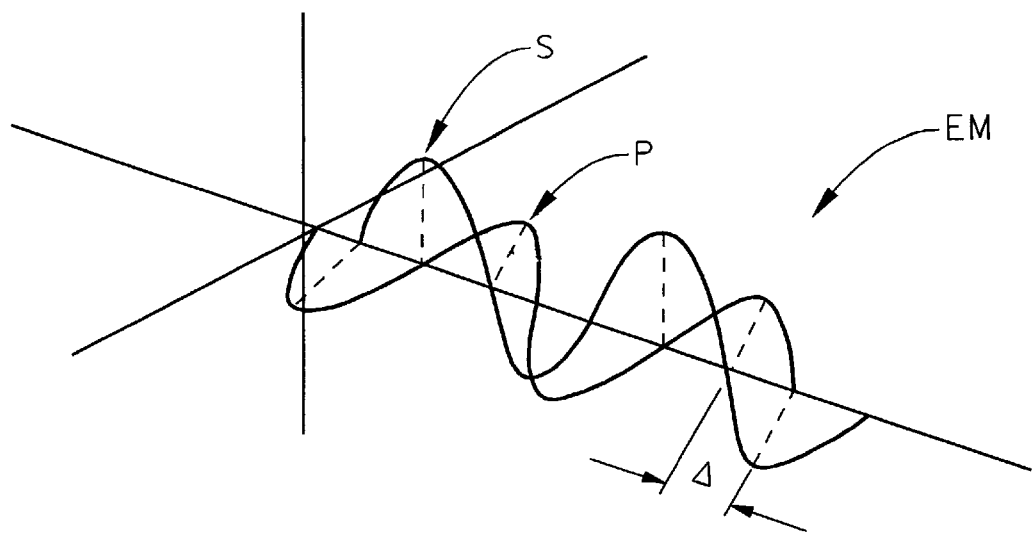
FIG. 1 shows a polarized beam of electromagnetic radiation (EM) indicating the presence of "P" and "S" orthogonal components.
Figure 2:
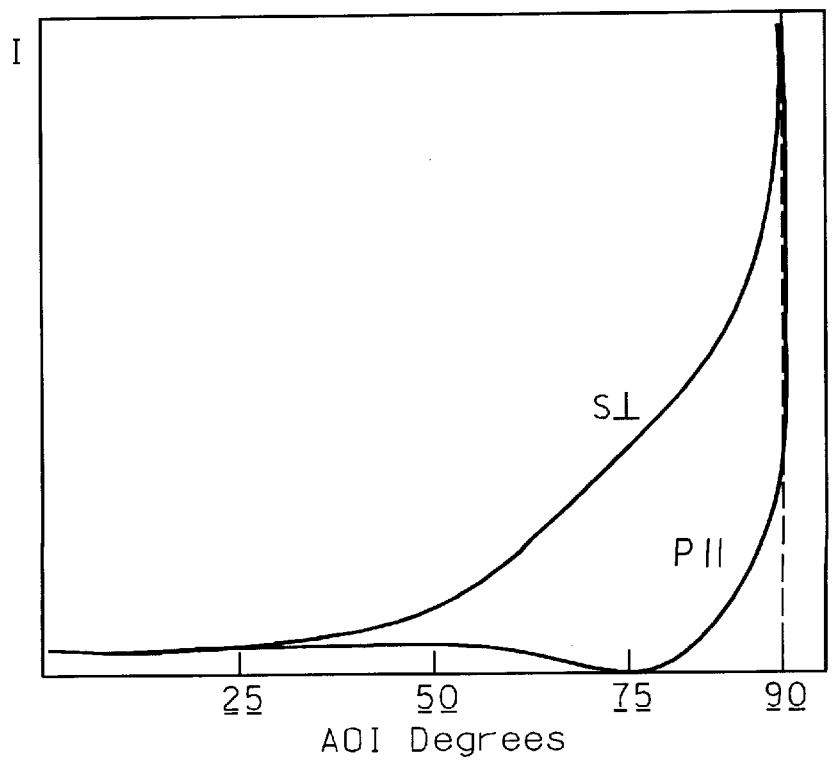
FIG. 2 shows typical plots of said "P" and "S" components as a function of angle-of-incidence to a normal to an investigated surface of a semiconductor.

Turning now to FIG. 1, to provide insight there is shown a polarized beam of electromagnetic radiation (EM) indicating the presence of "P" and "S" orthogonal components. FIG. 2 shows typical plots of said "P" and "S" components as a function of angle-of-incidence to a normal to an investigated surface of a semiconductor sample system. Note in FIG. 2 that the "P" orthogonal component, (ie. the orthogonal component of the polarized electromagnetic beam parallel to a sample surface investigated surface), passes through essentially zero (0.0) at an angle-of-incidence of approximately seventy-five (75) degree. This is the well known "Brewster" angle. It is further noted that typical ellipsometric practice involves measuring the ration of said "P" and "S" components to provide a (PSI) value, as well as measuring a phase angle (DELTA) between said "P" and "S" orthogonal components. A ratio of orthogonal components (P/S), it will be appreciated from FIG. 2, will be most significant at the Brewster Angle, and, hence a Brewster angle of incidence is most applicable in Brewster angle polarizer systems.

Figure 3:
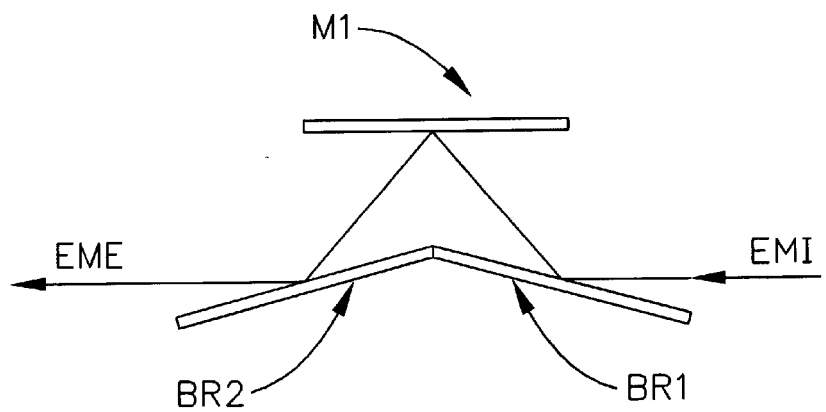
FIG. 3 shows a prior art double (BR1) and (BR2) Brewster angle polarizer system which includes an intermediate reflective means (M).
Figure 4A:
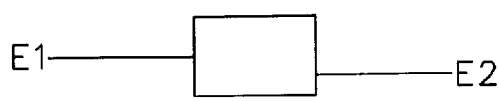
FIGS. 4a and 4b show displacement and deviation between electromagnetic beams (E1) and (E2) respectively.
Figure 4B:
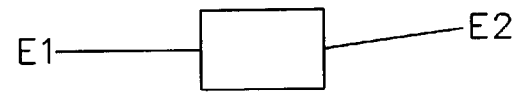

FIG. 3 shows a prior art double (BR1) and (BR2) Brewster angle polarizer system which includes an intermediate reflective means (M), wherein said identified (BR1), (BR2) and (M) elements are oriented so that an incoming beam of electromagnetic radiation (EM1) exits as a beam of electromagnetic radiation (EM2) which is undisplaced and undeviated from said (EM1). (Note, for reference, that FIGS. 4a and 4b show displacement and deviation between electromagnetic beams (E1) and (E2) respectively).

Figure 5:
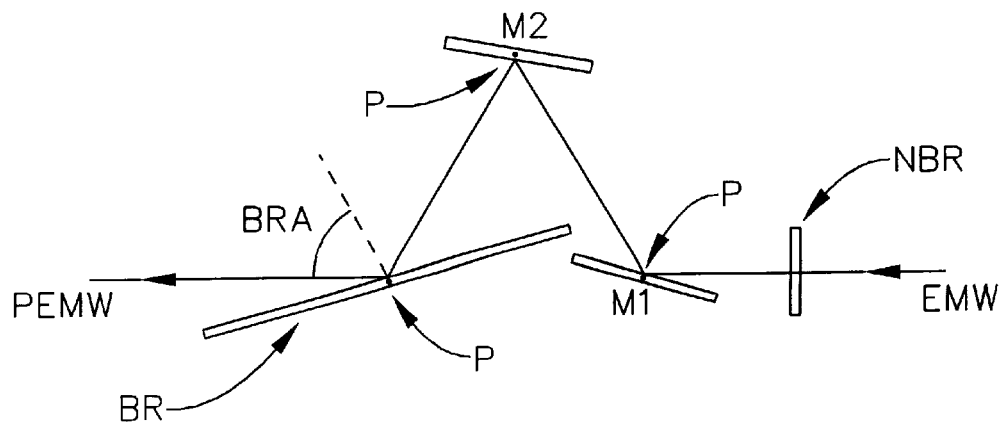
FIG. 5 shows the system of the present invention Brewster angle and non-Brewster angle polarizer system.

Turning now to FIG. 5, there is shown the system of the present invention. Note that the system of the present invention provides that an input beam of electromagnetic radiation (EMW) is caused to pass-through a non-Brewster angle polarizer (NBR), reflect from a first reflective means (M1), then from a second reflective means (M2), then interact with a Brewster angle polarizer system (BR) by impinging thereupon at an angle (BRA), (nominally the Brewster angle), and exit as beam of electromagnetic radiation (PEMW). Note that the first (M1) and second (M2) reflective means and Brewster angle polarizer system (BR) are all shown as optionally having Pivot means (P) which, when present, allow orientation adjustment thereof so that in use the beams of electromagnetic radiation (EMW) and (PEMW) can be aligned with one another so that there is no displacement or deviation therebetween as demonstrated in FIGS. 4a and 4b. (It is noted that where the non-Brewster polarizer (NBR) is a wire grid type, the present invention can be utilized in the Infrared wavelength band). It is to be understood that the direction of the electromagnetic beam can be reversed in FIG. 5, so that it first interacts with the Brewster angle polarizer (BR) before reflecting from the reflective means (M2) and (M1) and passing through the non-Brewster polarizer (NBR) polarizer. Also, it is noted that the reflective means (M1) and (M2) are typically, though not necessarily, mirrors which do not introduce significant retardation into a beam of electromagnetic radiation caused to interact therewith.

Figure 6:
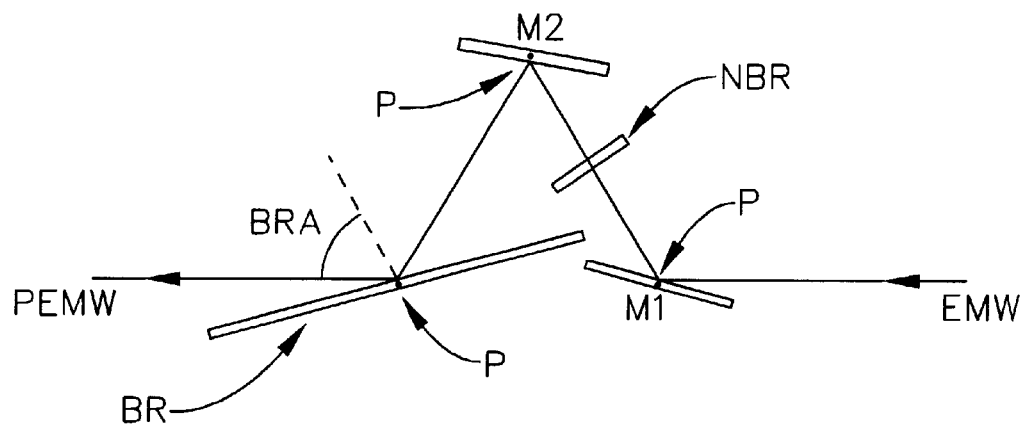
FIGS. 6 and 7 show alternative embodiments of the present invention Brewster angle and non-Brewster angle polarizer system.
Figure 7:
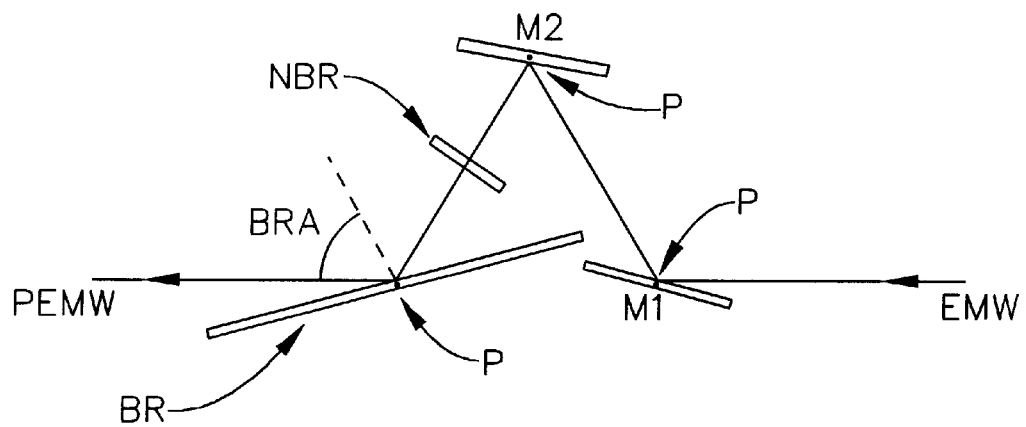

FIGS. 6 and 7 show variations of the present invention embodiment shown in FIG. 5 in which the two reflective means (M1) (M2) are not between the Brewster angle (BR) and non-Brewster angle (NBR) polarizers, but rather the non-Brewster (NBR) angle polarizer is positioned either between the two reflective means (M1) (M2), (see FIG. 6), or adjacent to the Brewster (BR) angle polarizer, (see FIG. 7). Said embodiments are functional and are within the scope of the present invention. In fact said embodiments can provide a present invention polarizer system with an even smaller lateral dimension that the embodiment shown in FIG. 5. As with the embodiment shown in FIG. 5, it is to be understood that the propagation direction of the beam of electromagnetic radiation shown can be reversed such that interaction with the Brewster angle polariser occurs first.

The present invention system in any of its embodiments is typically laterally shorter than a dual Brewster angle polarizer systems such as shown in FIG. 3, but provides a high extinction coefficient between electromagnetic radiation beam orthogonal components in use.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

What is claimed is:

1. A system for linearly polarizing a beam of electromagnetic radiation consisting of, in a functional sequence, a Brewster angle polarizer and a non-Brewster angle polarizer, between which, as defined by a pathway followed by an electromagnetic beam caused to pass therethrough, are present at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer; and a beam of electromagnetic radiation is caused to interact with said Brewster angle polarizer, reflect from a first reflective means, reflect from a second reflective means and then pass through said non-Brewster angle polarizer.

2. A system for linearly polarizing a beam of electromagnetic radiation as in claim 1, wherein the orientation of at least one of said at least first and second reflective means and said Brewster angle polarizer, can be adjusted by at least on motion selected from the group consisting of:

rotational; and translational;

in at least one dimension, so that a beam of electromagnetic radiation exiting, can be caused to be undeviated and undisplaced from a beam of electromagnetic radiation caused to enter, said system for linearly polarizing a beam of electromagnetic radiation.

3. A system for linearly polarizing a beam of electromagnetic radiation as in claim 2, wherein the orientation of at least one of said at least first and second reflective means and said Brewster angle polarizer is adjustable via a rotation about a pivot mounting.

4. A method of linearly polarizing a beam of electromagnetic radiation comprising the steps of:

a. providing a system for linearly polarizing a beam of electromagnetic radiation comprising, in a functional sequence, a Brewster angle polarizer and a non-Brewster angle polarizer, between which, as defined by a pathway followed by an electromagnetic beam caused to pass therethrough, are present at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer; and a beam of electromagnetic radiation is caused to interact with said Brewster angle polarizer, reflect from a first reflective means, reflect from a second reflective means and then pass through said non-Brewster angle polarizer;

said system for linearly polarizing a beam of electromagnetic radiation comprising means for adjusting the orientation of at least one of said at least first and second reflective means and said Brewster angle polarizer, by at least one motion selected from the group consisting of:

rotational; and translational;

in at least on dimension, so that a beam of electromagnetic radiation exiting, can be caused to be undeviated and undisplaced from a beam of electromagnetic radiation caused to enter, said system for linearly polarizing a beam of electromagnetic radiation;

b. causing an input beam of unpolarized electromagnetic radiation to enter said system for linearly polarizing a beam of electromagnetic radiation, and in a functional order selected from the group consisting of:

first the non-Brewster angle polarizer and second the Brewster angle polarizer; and first the Brewster angle polarizer and second the non-Brewster angle polarizer;

pass said non-Brewster polarizer and interact with said Brewster angle polarizer, and exit therefrom as an essentially linearly polarized state exit beam of electromagnetic radiation; and c. as required, adjusting the orientation of at least one of said at least first and second reflective means and said Brewster angle polarizer so that the exit beam of electromagnetic radiation is substantially undeviated and undisplaced from said input beam of unpolarized electromagnetic radiation.

5. A system for linearly polarizing a beam of electromagnetic radiation consisting of, in any functional sequence, a Brewster angle polarizer and a non-Brewster angle polarizer and at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer;

a beam of electromagnetic radiation is caused to interact with said Brewster angle polarizer, reflect from a first reflective means, reflect from a second reflective means and then pass through said non-Brewster angle polarizer;

a beam of electromagnetic radiation is caused to reflect from a first reflective means, pass through said non-Brewster angle polarizer, reflect from a second reflective means and then interact with said Brewster angle polarizer;

a beam of electromagnetic radiation is caused to interact with said Brewster angle polarizer, reflect from a first reflective means, pass through said non-Brewster angle polarizer, and then reflect from a second reflective means.

6. A system for linearly polarizing a beam of electromagnetic radiation as in claim 5, wherein the orientation of at least one of said at least first and second reflective means and said Brewster angle polarizer, can be adjusted by at least one motion selected from the group consisting of:

rotational; and translational;

in at least one dimension, so that a beam of electromagnetic radiation exiting, can be caused to be undeviated and undisplaced from a beam of electromagnetic radiation caused to enter, said system for linearly polarizing a beam of electromagnetic radiation.

7. A system for linearly polarizing a beam of electromagnetic radiation as in claim 6, wherein the orientation of at least one of said at least first and second reflective means and said Brewster angle polarizer is adjustable via a rotation about a pivot mounting.

8. A method of linearly polarizing a beam of electromagnetic radiation comprising the steps of:

a. providing a system for linearly polarizing a beam of electromagnetic radiation comprising, in any functional sequence, a Brewster angle polarizer and a non-Brewster angle polarizer and at least two reflective means, such that in use one selection from the following group applies:

a beam of electromagnetic radiation is caused to pass through said non-Brewster angle polarizer, reflect from a first reflective means, reflect from a second reflective means and then interact with said Brewster angle polarizer;

a beam of electromagnetic radiation is caused to interact with said Brewster angle polarizer, reflect from a first reflective means, reflect from a second reflective means and then pass through said non-Brewster angle polarizer;

a beam of electromagnetic radiation is caused to reflect from a first reflective means, pass through said non-Brewster angle polarizer, reflect from a second reflective means and then interact with said Brewster angle polarizer;

a beam of electromagnetic radiation is caused to interact with said Brewster angle polarizer, reflect from a first reflective means, pass through said non-Brewster angle polarizer, and then reflect from a second reflective means;

a beam of electromagnetic radiation is caused to reflect from a first reflective means, reflect from a second reflective means, pass through said non-Brewster angle polarizer, and then interact with said Brewster angle polarizer;

a beam of electromagnetic radiation is caused to interact with said Brewster angle polarizer, pass through said non-Brewster angle polarizer, reflect from a first reflective means, and then reflect from a second reflective means;

said system for linearly polarizing a beam of electromagnetic radiation comprising means for adjusting the orientation of at least one of said at least first and second reflective means and said Brewster angle polarizer, by at least one motion selected from the group consisting of:

rotational; and translational;

in at least one dimension, so that a beam of electromagnetic radiation exiting, can be caused to be undeviated and undisplaced from a beam of electromagnetic radiation caused to enter, said system for linearly polarizing a beam of electromagnetic radiation;

b. causing an input beam of unpolarized electromagnetic radiation to enter said system for linearly polarizing a beam of electromagnetic radiation, and in a functional order selected from the group consisting of:

first the non-Brewster angle polarizer and second the Brewster angle polarizer; and first the Brewster angle polarizer and second the non-Brewster angle polarizer;

pass through said non-Brewster polarizer and interact with said Brewster angle polarizer and exit as an essentially linearly polarized state exit beam of electromagnetic radiation; and c. as required, adjusting the orientation of at least one of said at least first and second reflective means and said Brewster angle polarizer so that the exit beam of electromagnetic radiation is substantially undeviated and undisplaced from said input beam of unpolarized electromagnetic radiation.

\* \* \* \* \*